Dec. 1, 1959     H. G. ABBEY     2,915,169
CONVEYOR CHAIN AND TRACKWAY ASSEMBLY
Filed April 19, 1957     5 Sheets-Sheet 5
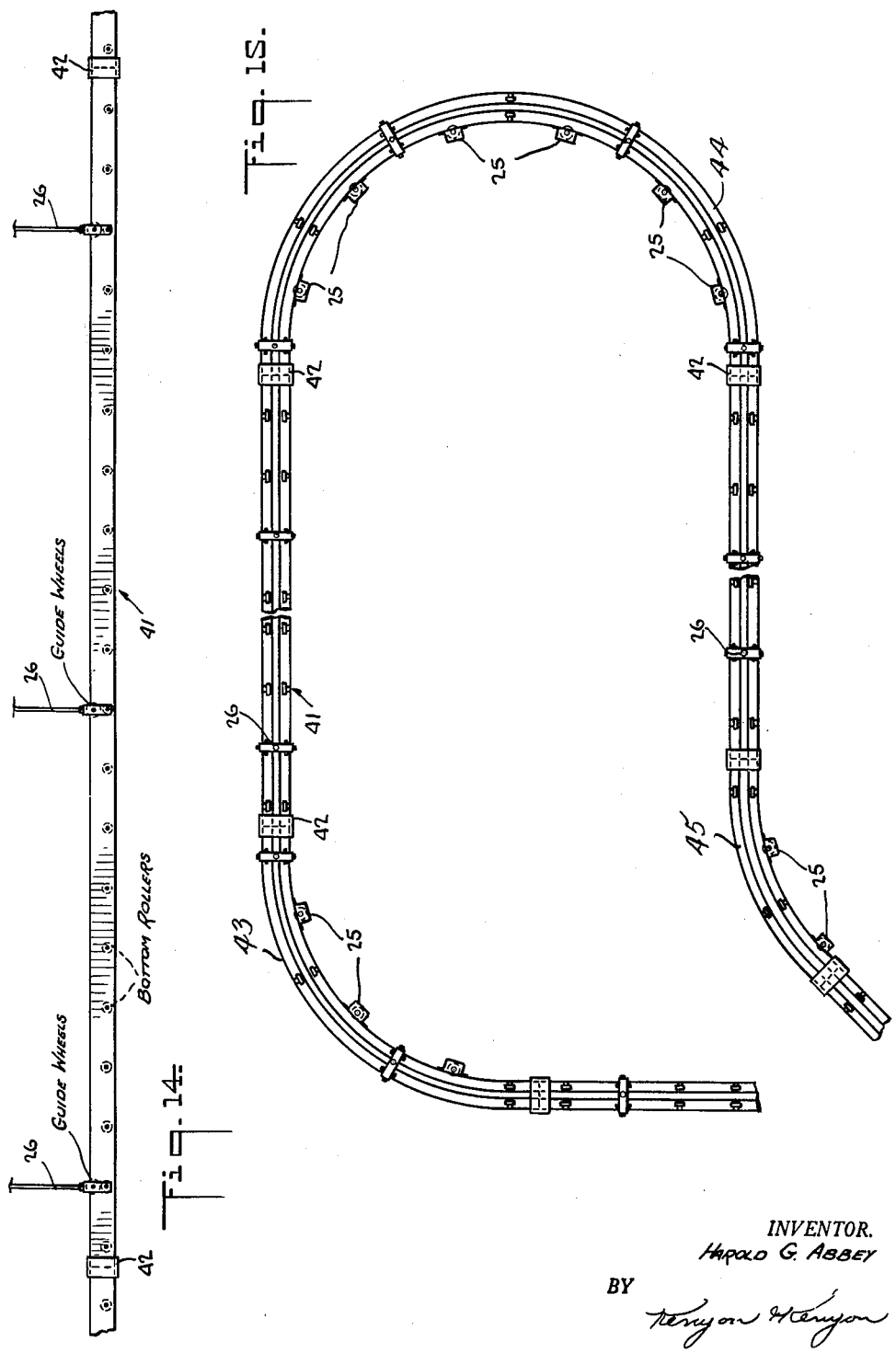
INVENTOR.
HAROLD G. ABBEY
BY
ATTORNEYS

United States Patent Office 2,915,169
Patented Dec. 1, 1959

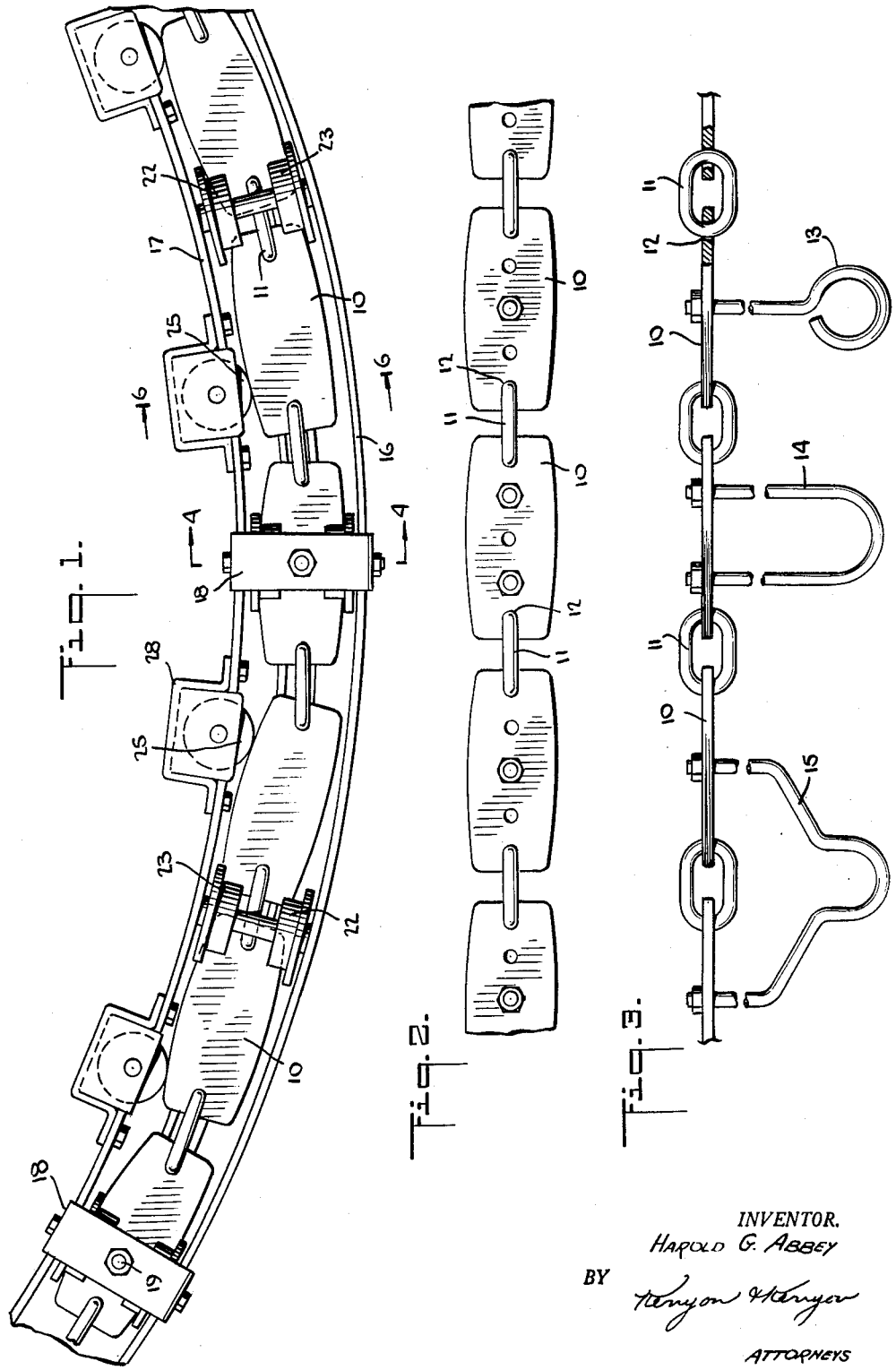

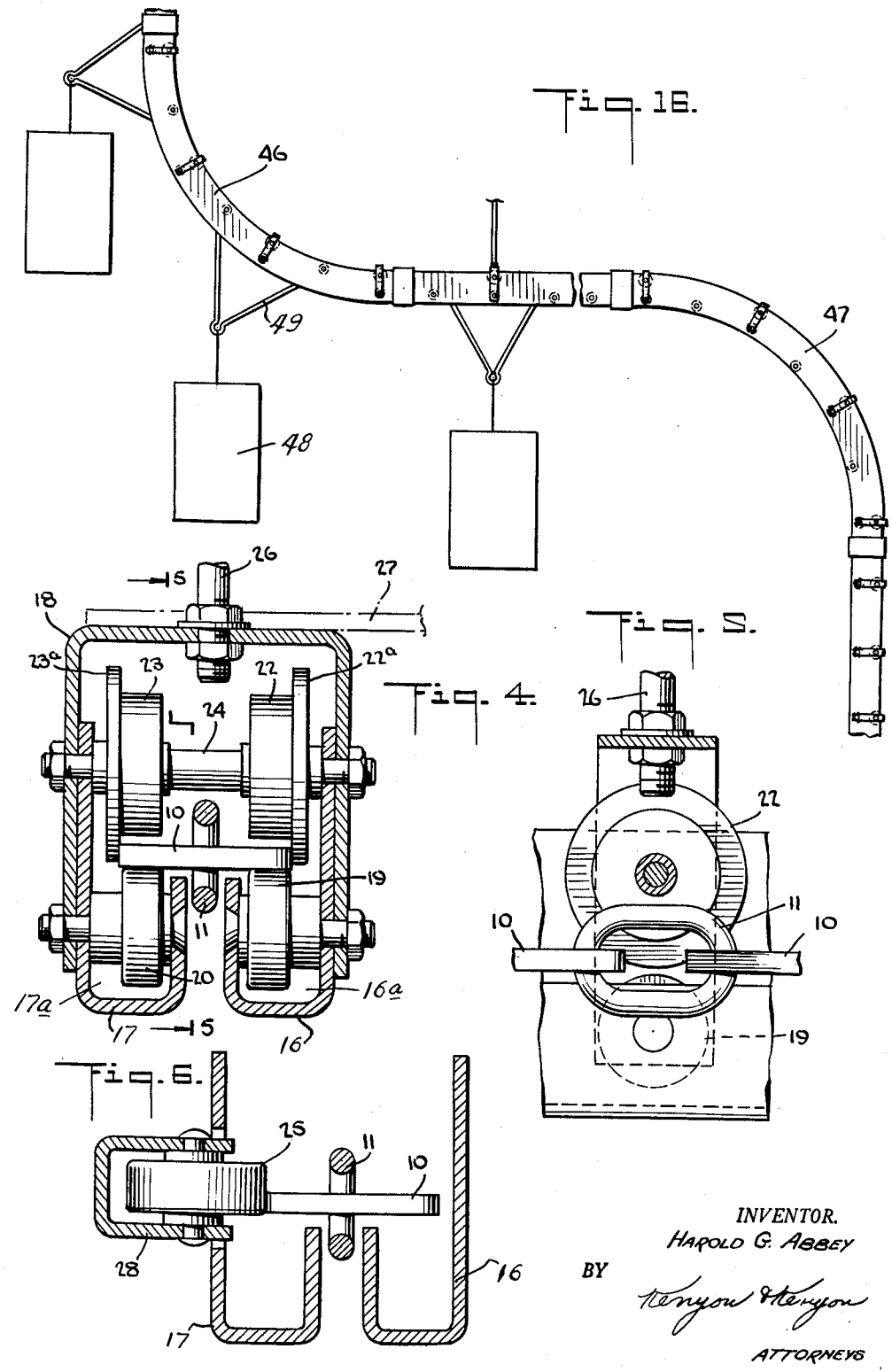

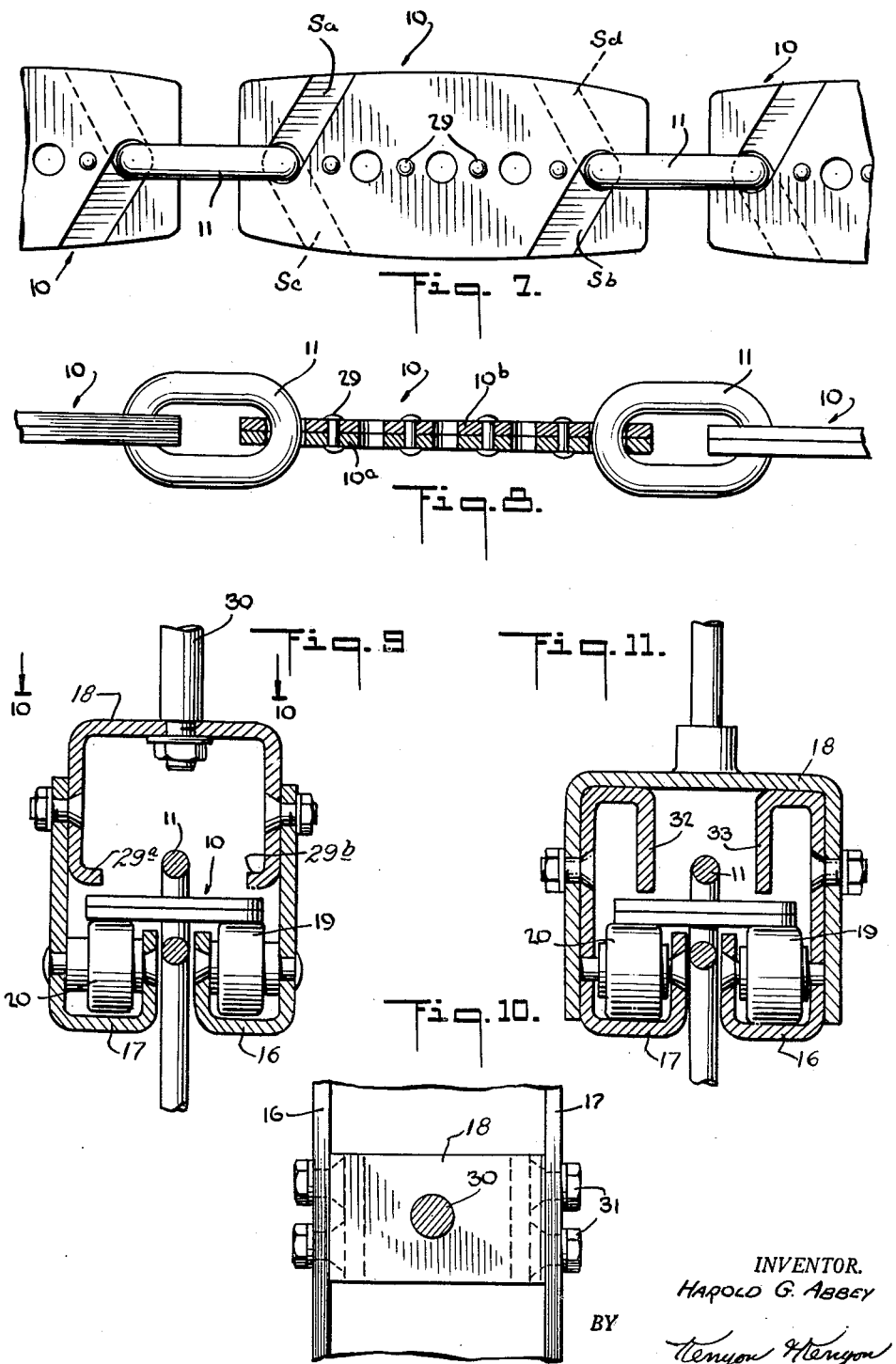

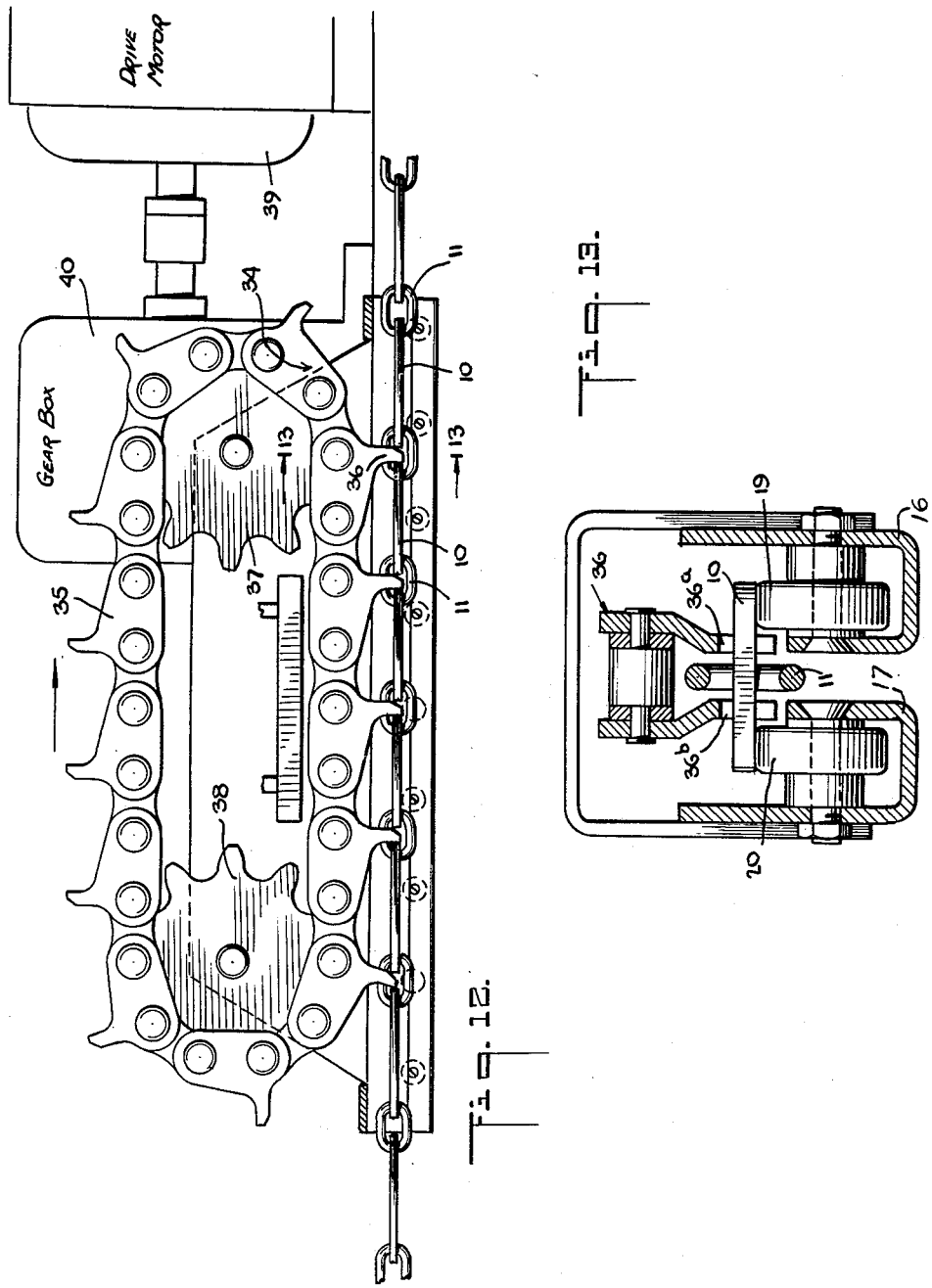

2,915,169
CONVEYOR CHAIN AND TRACKWAY ASSEMBLY
Harold G. Abbey, Jamaica, N.Y.
Application April 19, 1957, Serial No. 654,005
5 Claims. (Cl. 198—177)

The present invention relates generally to conveyor chain and trackway assemblies for conveying articles suspended from the chain and more particularly to a conveyor chain so constructed that it may turn in any direction.

Various attempts have been made to design a continuous conveyor chain possessing flexibility of movement in vertical and lateral directions. Such chains generally involve universal joints of elaborate construction as well as special trackways. Flexible conveyor chains of the type heretofore known also incorporate rollers to facilitate chain movement along curved tracks. Chains of this design are far more expensive than standard link chains and are difficult to assemble.

In view of the foregoing, it is the chief object this invention to provide a conveyor chain and trackway combination of simple and efficient design adapted to convey articles in any desired direction.

More particularly, it is an object of the invention to provide a universal conveyor chain formed of readily constructed and assembled parts, which chain may be used for movement in a horizontal plane or in a vertical plane or in both planes along curved paths.

Also an object of the invention is to provide a low cost conveyor chain and trackway combination of large carrying capacity. An important feature of the invention resides in the fact that the conveyor can be quickly erected and also that it may be actuated by a single drive system.

Briefly stated, in a conveyor chain and trackway assembly in accordance with the invention, the chain is constituted by a series of rectangular flat plates interlinked by loops passing through end holes in said plates, said plates being aligned with the longitudinal axes of said loops and lying in a plane normal thereto. The trackway is constituted by a pair of rails held in spaced parallel relation and including inside channels for supporting bottom rollers on which said plates rides.

The channels are separated to define a longitudinal opening to permit passage of said loops and for load bars attached to said plates and extending below said trackway.

For a better understanding of the invention, as well as further features and objects thereof, reference is made to the following detailed description to be read in conjunction with the accompanying drawing wherein like components in the several views are identified by like reference numerals.

In the drawings:

Fig. 1 is a plan view of a preferred embodiment of a conveyor chain and curved trackway assembly in accordance with the invention.

Fig. 2 separately shows the chain in plan view.

Fig. 3 is a side view of the chain with various forms of load bars attached thereto.

Fig. 4 is a transverse section taken in the plane of lines 4—4 of Fig. 1 showing the construction of the trackway rollers and the hanger bracket therefor.

Fig. 5 is a section taken along the plane of lines 5—5 in Fig. 4.

Fig. 6 is a transverse section taken along the plane indicated by lines 6—6 in Fig. 1, showing the construction of a side roller on the trackway.

Fig. 7 is an enlarged detail showing the construction of the chain in plan view.

Fig. 8 is a side view of the chain in which the plate element thereof is sectioned.

Fig. 9 is an alternative form of rail construction for the trackway.

Fig. 10 is a view taken in the plane indicated by line 10—10 in Fig. 9.

Fig. 11 is still another form of rail construction for the trackway.

Fig. 12 shows in elevational view a drive system for the chain conveyor.

Fig. 13 is a section taken along line 13—13 in Fig. 12.

Fig. 14 schematically shows an elevation of a straight section of the trackway.

Fig. 15 shows the trackway with various horizontally curved sections.

Fig. 16 shows a trackway with various vertically curved sections.

Referring now to the drawings and more particularly to Figs. 1 to 3, a conveyor chain in accordance with the invention is constituted by a series of flat plates 10 of generally rectangular shape interlinked by oval loops 11. The loops 11 pass through suitable holes 12 in the ends of the plate, the plane of the loops being normal to that of the plates. Thus the plates may swing about the loops either in the horizontal plane or the vertical plane whereby the chain is universally flexible and may be moved through horizontal or vertical curves. In the event a need exists for an exceptionally wide swing of the plates, adjacent plates may be provided with matching convex and concave ends to facilitate angular movement thereof.

To suspend loads from the chain, various forms of attachments are provided. Typical attachments or load bars are shown in Fig. 3 from which loads may be hung. An eye 13 may be bolted to the plate 10 at the center bar thereof, or the support may be in the form of a U-shaped yoke 14 attached to the plate at spaced points thereon to provide a convenient means for suspending a heavy load from the chain. Alternatively, the load bar 15 may be attached between two adjacent plates. It is obvious that various expedients may be used to hook a load onto the chain.

Fig. 1 shows a horizontally curved trackway section including an outer rail 16 and an inner rail 17 parallel thereto, the rails being held together at spaced positions by bracket members 18. As best seen in Figs. 4 and 5, tracks 16 and 17 are of J-shaped cross-section to define channels 16a and 17a within which are rotatably supported rollers 19 and 20. The plates 10 of the conveyor chain ride on rollers 19 and 20, the loops 11 of the chain moving freely in the longitudinal space 21 between the rails. The load rods suspended below the plates 10 also extend through the space 21 and are of sufficient length to clear the trackway.

To maintain the position of the chain conveyor on the rails, guide wheels 22 and 23 are provided rotatably supported on a spindle 24 spanning the rails 16 and 17, the wheels being vertically aligned with the rollers. Guide wheels 22 and 23 are provided with flanges 22a and 23a which engages the edges of the plates 10 to prevent lateral shifting of the chain on the rollers 19 and 20. The trackway may be supported by vertical hanger rods 26 or by side brackets 27, depending of course on the nature of the installation.

Since the trackway is horizontally curved and the moving chain tends to abut the inner rail, it is also necessary to provide horizontal rollers 25 on the inner rail 17, as shown in Fig. 6. These rollers engage the edge of the plates 10 and are rotatably supported in casings 28 projecting outwardly from the inner rail and mounted securely therein. Thus as the chain is driven through the horizontally curved track, the plates 10 pivot about the loops 11 to follow the curvature of the track.

Referring now to Figs. 7 and 8 which illustrate the structure of the chain, it will be seen that flat plates 10 are formed by laminating together two plate components 10a and 10b. Cut into plate component 10a adjacent the ends thereof are two finger-shaped slots Sa and Sb. The slots extend inwardly from opposing edges of the component 10a and terminate at the longitudinal center of the component, the slots Sa and Sb being angled toward the ends of the components. Cut into plate component 10b are two like slots Sc and Sd, the slots extending inwardly from opposing edges of the component and terminating at the longitudinal center, the slots being angled toward the ends of the component.

The slots Sa and Sb are reversely angled relative to slots Sc and Sd. Thus at the point of intersection of slots Sa and Sc an opening is provided for one loop 11, and at the point of intersection of slots Sb and Sd an opening is provided for the next loop.

To assemble the chain, two loops are first inserted in the slots of the component 10a and the component 10b is then applied to lock in the loops, the two components being thereafter riveted or welded together at points 29. Thus the assembly of the chain is very simple and the chain components may be readily manufactured at low cost. When using split flat plates, as herein illustrated, the loops may be of solid ovals. Alternatively, the flat plates may be of solid construction, in which case the loops are welded at their seams after insertion in the holes of the plates.

Figs. 9 and 10 illustrate an alternate form of trackway construction making use of the same rails 16 and 17 and rollers 19 and 20 shown in Fig. 4, but dispensing with the upper guide wheels. Instead, the arms of bracket 18 are provided with inwardly extending flanges 29a and 29b which act to limit the upward movement of the chain plates 10. Bracket 18 has hanger rods 30 projecting vertically therefrom for mounting the trackway. The vertical arms of the bracket are bolted to the rails 16 and 17 by bolts 31, as best seen in Fig. 10.

A further simplified trackway construction is shown in Fig. 11, in which the same bracket 18 is used as in Fig. 4, but wherein the rails 16 and 17 further include vertical guide elements 32 and 33 in spaced parallel relation to the rail walls acting to limit upward displacement of the chain plates.

Referring now to Figs. 12 and 13, the drive system for the conveyor chain is shown comprising a caterpillar drive belt 34 formed by interlinked drive elements 35 from which project dogs 36. Each dog as best seen in Fig. 13 is composed of two teeth 36a and 36b which are spaced apart to straddle the loop 11 and to extend between adjacent plates 10 so that when the belt is driven, the teeth engage the rear edge of the plate to push the chain.

The section of trackway as shown in Fig. 13 within which the caterpillar belt operates is essentially the same as that shown in Fig. 4, except that the guide wheels are removed to make way for the drive dogs. The belt is mounted between two sprocket wheels 37 and 38. Sprocket wheel 37 is rotated by an electric motor 39 through a gear reduction box 40, sprocket wheel 38 being an idler wheel.

Referring now to Fig. 14, a typical straight section 41 of track is shown in section in a practical arrangement. Hangers 26 are attached to brackets at equispaced intervals, there being upper wheels provided at each bracket position as well as bottom rollers. Between brackets there are a series of seven bottom rollers. Splicing collars 42 are provided to join sections of track.

A trackway with horizontal sections joined together by coupling collars 42 is shown in Fig. 15. Track section 43 has a 90° horizontal curvature, track section 44 has a 180° horizontal curvature and track section 45 has a 45° horizontal curvature, the curved sections being interconnected by straight sections. The inner rail of each curved section is provided with side rollers 25, very much in the manner shown in Fig. 1. It will be evident that numerous curvature variations are possible.

In Fig. 16, trackway sections are shown in which the curvature is in the vertical. Section 46 has a 90° outside vertical curvature and is joined by a straight section to a section 47 having a 90° vertical inside curvature. The loads 48 are suspended from load bars 49 attached to the conveyor chain, the load bars being sufficiently extended from the chain to permit free swing of the load and the chain travels upwardly in the trackway. The trackway may therefore be installed so as to transport articles to any point in a given plant and to elevate or lower articles from one floor to the next, no restrictions being placed on the direction of movement.

While there has been shown what at present is considered to be a preferred embodiment of the invention, it is to be understood that many changes and modifications may be made therein without departing from the essential spirit of the invention. It is intended, therefore, in the accompanying claims to cover all such changes and modifications as fall within the true spirit of the invention.

What is claimed is:

1. A conveyor chain and trackway assembly comprising a chain constituted by a series of flat plates of generally rectangular shape interlinked by loops passing through end holes in said plates, said loops being aligned with the longitudinal axis of said plates and lying in a plane normal thereto; and a trackway for said chain including a pair of rails in spaced parallel relation provided with inside channels having rollers mounted therein on which said plates are rideable, said rails having a separation defining a longitudinal passageway for said loops and for load bars suspended from said plates.

2. A universally flexible conveyor chain comprising a series of flat plates of generally rectangular shape interlinked by oval loops passing through holes adjacent the ends of said plates, said loops being aligned with the longitudinal axis of said plates and lying in a plane normal thereto, and guide bars secured to said plates at points thereon lying on said axis, said plates being constituted by two plate components laminated together, said plate components having notches extending inwardly from opposing edges to the longitudinal center and angles toward the ends thereof, the notches of said plate components being reversely related to provide openings at the points of intersection for accommodating said loops.

3. A trackway adapted for supporting a conveyor chain constituted by a series of flat plates interlinked by loops passing through end holes in said plates and lying in a plane normal thereto, said trackway comprising a pair of spaced rails in parallel relation provided with inside channels having bottom rollers therein on which said plates are rideable, said channels being separated from each other to define a longitudinal passageway for said loops, and a pair of upper guide wheels rotatably supported between said rails and aligned with said rollers, said wheels having flanges engaging the edges of said plates to maintain the position of said chain on said rollers.

4. A trackway, as set forth in claim 3, further including a U-shaped bracket member whose arms are attached to said rails to maintain the separation thereof, and hanger means attached to said bracket to support said trackway from a ceiling.

5. A trackway adapted to support a conveyor chain constituted by a series of flat plates of generally rectangular shape interlinked by loops passing through end holes in said plates and lying in a plane normal thereto, load bars perpendicularly suspended from said plates, said trackway comprising a pair of J-shaped rails defining inside channels, and bottom rollers disposed in said channels on which said chain plates are rideable, said rails further including guide elements to limit upward movement of said plates, said rails being spaced apart to define a longitudinal passageway for said loops and said load bars.

References Cited in the file of this patent

UNITED STATES PATENTS

| | | |
|---|---|---|
| 581,131 | Pancoast | Apr. 20, 1897 |
| 1,277,617 | McBride | Sept. 3, 1918 |
| 1,902,512 | Mehl | Mar. 21, 1933 |
| 1,972,931 | Haddlesay | Sept. 11, 1934 |
| 2,058,804 | Knies | Oct. 27, 1936 |
| 2,695,702 | Ellen | Nov. 30, 1954 |